Sept. 26, 1961 F. F. FEFELOV 3,001,316
MECHANICAL WEIGHT AND BAIT-HOOK CASTER
Filed March 8, 1960
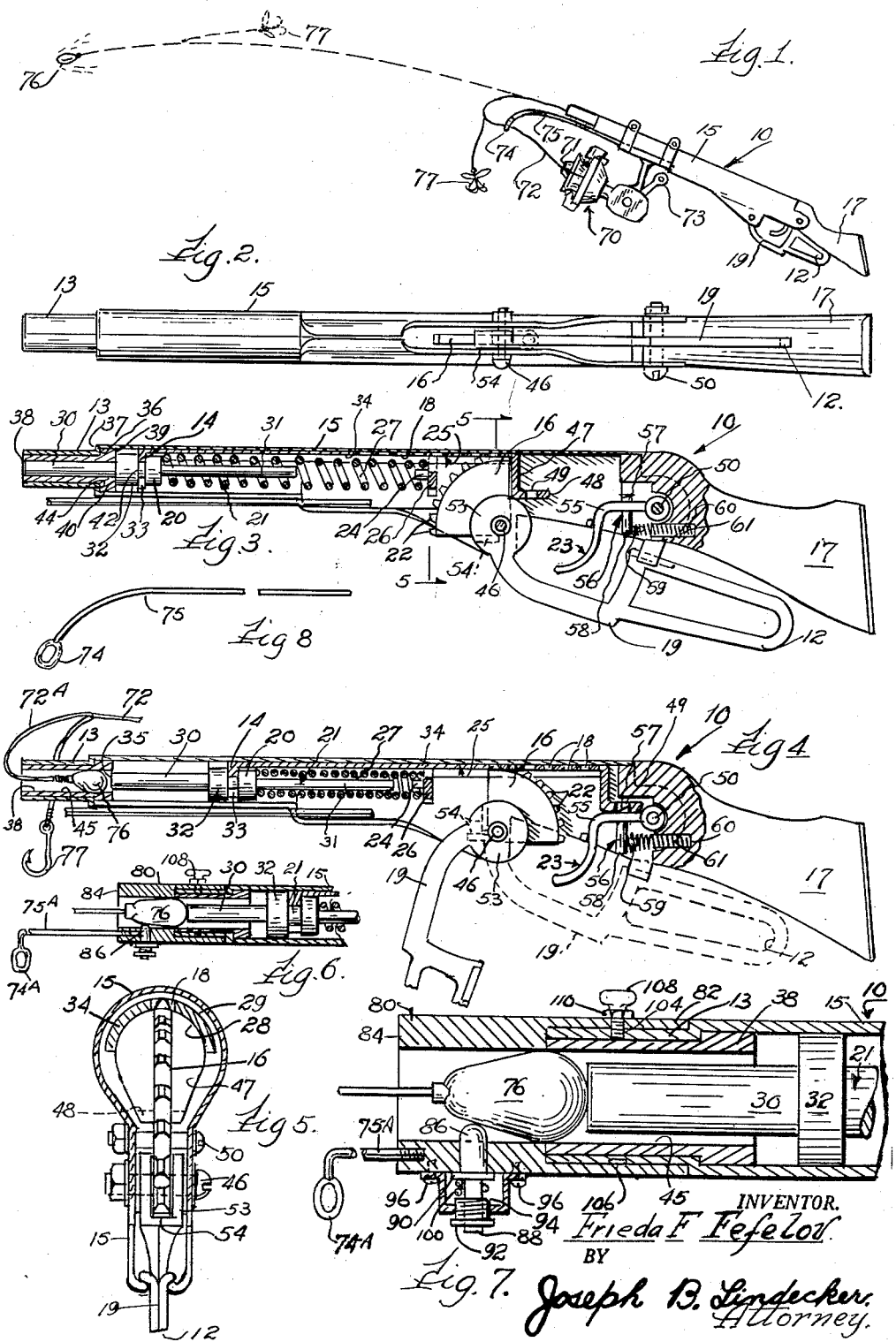
INVENTOR.
Frieda F Fefelov
BY
Joseph B. Lindecker.
Attorney.

United States Patent Office 3,001,316
Patented Sept. 26, 1961

3,001,316
MECHANICAL WEIGHT AND BAIT-HOOK CASTER
Frieda F. Fefelov, 3915 W. 192nd St., Homewood, Ill.
Filed Mar. 8, 1960, Ser. No. 13,532
2 Claims. (Cl. 43—19)

This invention relates to improvements in mechanical bait casters for propelling the bait and unreeling the line.

The main object of the invention is to provide a mechanical device for anglers' use by means of which the bait is accurately cast to a point desired.

Another object is to provide a device of this character consisting of a suitable construction of a spring-gun upon which the reel carrying the line is mounted and which embodies suitable means for propelling the sinker and baited hook which is especially useful for shore fishing, avoiding the necessity of the fisherman wading into the water to throw his line to the desired point at a distance therefrom.

Another object of the invention is to provide a gun-type casting rod which requires very little overhead room for casting and for drawing in the catch.

Another object of the invention is the provision of a compact gun-type fishing rod and reel which may be easily and quickly disassembled and assembled.

A further object of the invention is to provide a simple, slightly modified spring-gun which has removably secured thereto a fishing reel, particularly a spinning type casting reel which permits a fishing line to run free from a normally stationary spool, and provided with means for quick rewinding of the line on the spool, the spool constructed so as to prevent the line from fouling whenever it becomes slack, before or after casting, or as the line is wound upon the spool by the rotation of the flyer element of the reel with respect to the spool.

A still further object of the invention is to provide a gun-type fishing rod and reel mounted thereon, including means to mechanically cast the sinker and baited hook connected thereto, a sinker housing securable to the barrel of the gun-type fishing rod, releasable power means within the gun to strike the sinker in its housing and project the sinker with the line and baited hook to the spot desired in the water.

And still a further object of the invention is to provide a gun-type fishing rod, a reel mounted thereon, a sinker housing mounted upon the outer end portion of the rod, and a pin type device slidably mounted within the housing, spring means yieldably pressing said pin inwardly to retain the sinker therein with any position of the rod, and power means to project the sinker past said pin and out of said housing.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

FIGURE 1 is a side elevation of the completely assembled unit with the sinker concealed within the sinker housing of the gun-type fishing rod; the sinker and bait are further shown in projected state by dotted lines.

FIGURE 2 is a bottom view of the gun-type rod shown in FIGURE 1 but with the reel, the sinker and line removed.

FIGURE 3 is a central vertical sectional view of the gun-type rod shown in FIGURES 1 and 2, the coil spring being shown therein in extended position.

FIGURE 4 is a central vertical sectional view of the gun-type rod shown by FIGURES 1, 2 and 3, with the sinker arranged within the sinker housing, the coil spring in compressed position and partially ready for projecting the sinker by associated elements.

FIGURE 5 is an enlarged transverse sectional view taken substantially on line 5—5 of FIGURE 3.

FIGURE 6 is a fragmentary sectional view of the end portion of the gun-type rod, as shown in FIGURE 4, with a sinker retaining means mounted thereon.

FIGURE 7 is an enlarged sectional view of the device shown by FIGURE 6.

FIGURE 8 is a perspective view of the wire rod and loop type line guide formed on the free end thereof before assembly to the gun-type fishing rod.

Referring to the accompanying drawings, which are made a part hereof, and on which similar reference characters indicate similar parts, this device is in the form of a rifle type spring-gun 10 which includes a gun barrel 13, a frame structure 15, a stock 17 which is connected with the frame 15 in any suitable manner, a cocking lever 19 pivotally mounted on the frame 15 for cocking the operating plunger 21 of the spring-gun. A trigger 23 is illustrated as being pivotally connected with the frame and engageable with the rack type mechanism 25 associated with the plunger 21 so that when squeezed relative to the stock 17 it will release the rack type mechanism 25, thereby allowing the plunger for forward movement under the impetus of coil spring 27.

The operating plunger 21 is a cylindrical rod, or projector, which is actuated by the coil spring 27, one end of which bears against a collar 20, secured to the rod midway between its ends, and the other end of which bears against a stationary bearing plate 26 extending transversely and secured to the opposite internal side walls of said frame structure and below said rack 25 for that purpose, said bearing plate 26 having a forwardly projecting guide pin 24 assembled therewith to extending a short distance within the central rear end portion of the coil spring 27 to support the rear end of said coil spring 27 thereon. The plunger 21 is formed with a forward end portion 30 and a rear end portion 31, the forward end portion 30 being of greater diameter than the diameter of the rear end portion 31 which extends rearwardly through the central portion of the forward end portion of the coil spring 27. The junction of the forward end portion 30 and the rear end portion 31 forms an abutment against which said collar 20 is secured and against which the collar 20 is held by the forwardly exerting force of the spring 27. Spaced forwardly a short distance from the collar 20 is secured a collar 32 to the forward end portion 30 of plunger 21 forming an annular groove, or space 33, between the said collars 20 and 32. The extreme forward end of said plunger 21 has a vertical, circular striking surface 35, its purpose to be explained later.

The frame structure 15 is integrally formed with a cylindrical forward end portion having a barrel 13 at the forward end thereof, the junction of the barrel 13 with the frame structure 15 forms a stepped portion since the barrel 13 is smaller in diameter than the adjoining frame structure 15, the stepped portion within the frame structure forming an interior abutment 36 and an exterior abutment 37.

A tubular member 38 is assembled with the barrel 13, said member 38 having an enlarged hub portion 39 at the rear end thereof, the forward annular portion 44 of the hub 39 being in contact with the interior abutment 36, the rear annular portion 40 of the hub 39 forming a shoulder against which the collar 32 will strike when forced forwardly by the spring, which is in contact with the collar 20 on plunger 21, after the spring is released and which limits the travel of the collar 32, and said plunger 21. The tubular member 38 forms a bait-holding receptacle, or housing, with a cylindrical inside wall 45.

The rack type mechanism 25 consists of a longitudinal plate, or cylindrical segment 34, with a concave interior wall surface 28 and a convex exterior wall surface 29, said plate 34 having a longitudinal series of apertures 18 arranged in the rear half portion thereof. The forward end of said plate 34 having a downwardly extending tongue 14 which fits between collars 20 and 32 in groove 33, whereby upon rearward movement of the plate 34 it will cause collar 20 and plunger 21 to be retracted, compressing spring 27. The rear end of said plate is provided with a downwardly and outwardly extending arm 47, the horizontal terminal end portion 48 of arm 46 being provided with a single vertical bore 49 extending therethrough.

The cocking lever 19 is formed with a handle portion 12 at the lower end thereof and a U-shaped hub portion 53, pivotally mounted upon bolt 46. A gear segment 16, being substantially a 90 degree portion of a spur gear with gear teeth 22 extending outwardly therefrom is pivotally mounted upon bolt 46 between said U-shaped hub portion 53. The cocking lever 19 has a normally horizontal arm extension 54 arranged to engage complementary with the horizontal edge of gear segment 16. Rotary movement of said handle portion 12 away from the stock 17, in a clockwise direction, will cause the extension 54 to move segment gear 16 in a clockwise direction, the teeth 22 thereon will register with apertures 18 in plate 34 and retract the same.

The trigger 23 has a normally horizontal trigger extension 55 with a vertical pin 56 secured therewith, the upper end 57 of the pin 56 extending above the trigger extension 55 and adapted to project into bore 49 in end portion 48 of arm 47. The lower end 58 of pin 56 extends below trigger extension 55, said lower end 58 having a guide pin 59 extending rearwardly therefrom. A horizontal bore 60 is formed in the forward end of stock 17. A coil spring 61 is assembled within said bore 60 with the forward end thereof pivotally supported upon guide pin 59. The normal outward pressure of said spring 61 forces the lower end 58 of pin 56 in a forward, or clockwise direction, which rotates the trigger in a clockwise direction on bolt 50, causing the upper end 57 of pin 56 to extend upwardly through bore 49 of arm 47 of plate 34 when in retracted position, locking the spring 27 in compressed position. Therefore, the trigger is held forward by said spring 61 and pin 56 locks plate 34 in retracted position. The cocking lever 19 can be returned to its normal position adjacent stock 17, the segment gear will remain in its turned position with teeth thereof in engagement with apertures 18 in plate 34. Pulling upon the trigger 23 will lower pin 56 and release plate 34, the compressed spring 27 will be released and it will forcibly move the plunger 21 forwardly.

The line-reel 70 is suitably secured to the frame structure 15 upon the lower side thereof and ahead of the cocking lever 19. The reel has a stationary spool constructed so as to prevent the line from fouling whenever it becomes slack, before or after casting, or as the line is wound upon the reel by the rotation of the flyer element of the reel with respect to the spool. The reel is the so-called "spinning" type, its construction forming no part of this invention.

The line spool 71 permits the line 72 to be freely withdrawn endwise from the spool when using the reel for casting. Rotation of the handle 73 will effect rotation of the rotating flyer through suitable gears and the line 72 will be re-wound upon the spool 71. The line extends outwardly through a line guide loop 74 on the outer end of guide wire 75 suitably secured at its rear end to the frame structure 15. The line 72 from reel 70 passes through the guide loop 74 and has secured near the end a weight or line sinker 76 and hook 77. The line 72, when the projection mechanism is in use, has a slack portion 72-A which forms a fold between guide loop 74 and line sinker 76 mounted in tubular housing 38, the latter assembled in barrel 13. When the trigger is pulled, the spring 27 forces the plunger 21 forwardly and the end striking surface 35 thereof gives the sinker 76 a hammer blow. This force throws the line 72 and attached sinker 76 and hook 77 outwardly, the force which throws the sinker and line controlled by the length and quality of spring 27.

In order to retain the sinker 76 in the sinker housing 38 when the gun-type rod is pointed with its barrel 13 downwardly a tubular member 80 is attached to the end of the barrel 13. The member 80 has a sleeve portion 82 adapted to fit snugly on the exterior surface of barrel 13 and end portion thereof; the inner end of member 80 contacts the exterior abutment 37.

The member 80 also has a portion 84 with a bore equal to that of the bore of the sinker housing 38 so that the portion 84 of the tubular member 80 is virtually an extension of the housing 38, its bore being aligned with and forming a continuation of the bore of the housing 38. At one side of the portion 84 is a yieldable friction element 86 which, as illustrated in FIGURES 6 and 7, may be the rounded end portion of the plunger 88 which projects through the wall of the tubular member 80, the rounded end portion 86 being arranged to project into the bore of the extension 84. The plunger 88 is provided with an intermediate flange 90 which normally bears against the outer surface of the member 80 so as to limit the extent of projection of the friction element 86 into the bore. The outer portion of the plunger 88 extends slidably through a thimble 92 which is threaded into a supporting bracket 94, the latter being secured to the member 80 by suitable screws 96. Between the flange 90 and the thimble 92 is a compression spring 100 which serves to press the friction element 86 inward toward the axis of the member 80. The spring 100, however, permits the element 86 to yield radially outward so that its end may be flush with the inner surface of the member 80. When the sinker 76 is projected from the housing 38, one side thereof will engage the element 86 and force it outwardly, allowing it to pass into the atmosphere.

Since the sleeve portion 82 is cylindrical, it is readily slidable on the barrel 13. In order to secure the member 80 in any desired position, having guide wire 75-A with guide loop 74 attached in the end portion of member 80, a set-screw 104 is provided. This set-screw is threaded through the sleeve portion 82 of the member 80, the inner end of the screw projecting into a groove 106 which extends around the intermediate exterior portion of barrel 13 and is located so as to prevent the member 80 from coming off the end of the barrel 13 unless the set-screw 104 is backed off sufficiently to clear the groove 106. After the member 80 is assembled upon the barrel 13, the set-screw 104 is set up so as to bind against the bottom of the groove 106 and thus hold the member 80 in adjusted position. The set-screw 104 may have a thumb piece 108 at its end for convenient manipulation, and, if desired, a lock nut 110 may also be provided thereon. The sinker 76 travels along the inside wall of housing 38 and through member 80 past the element 86 if forcibly ejected by the plunger 21; however, the element 86 will retain the sinker 76 in the housing 38 when the plunger is in retarded position and ready for action. It is evident that the member 80 can be assembled upon the barrel 13 and used if desired, or the gun-type rod can be used without the member 80.

The sinker is normally egg-shape, the line 72 is attached to the smaller end of the sinker, the diameter of the larger portion of the sinker being slightly less than the diameter of the housing 38, the diameter of the end portion 30 of the plunger being slightly less than the diameter of housing 38, whereby the end 35 of end portion 30 of plunger 21 will strike a full hammer blow to the larger rear end of the sinker when the spring 27 is released by pulling on the trigger 23.

As shown in the drawings, the device is to be held somewhat in the position of a gun during the time when the cast is being made, and during this time the line-reel is positioned upon the under side of the frame structure 15, in front of the cocking lever 19, so as not to interfere therewith.

It is apparent that, within the scope of the invention, modifications and different arrangements may be made other than is herein disclosed, and the present disclosure is illustrative merely, the invention comprehending all variations thereof.

What I claim is:

1. A rifle type gun bait-caster comprising, in combination, a rifle type gun frame structure, a spinning type reel including a non-rotatable line carrying spool removably mounted upon the exterior surface of said gun frame structure, said gun frame structure including an integral barrel formed at the outer end thereof, a gun stock rigidly secured to the rear end of said gun frame structure, a long line attached at one end to said spool, a sinker with a line attaching means attached to the opposite end of said line, a bait-hook attached to a short second line which is attached to said first line in the proximity of said line sinker, said sinker having a rear end portion of semi-spherical configuration and a forward end portion of cone-shaped structure, said line attaching means attached to the apex of said cone-shaped structure, means within said gun frame structure to mechanically cast said line, said line sinker and bait hook having connected therewith a releasable power means within said gun frame structure adjacent the rear end thereof, said barrel being integrally formed with said frame structure and having an internal diameter that is less than the internal diameter of said frame structure and providing a stepped portion therebetween and forming an interior abutment, a line sinker housing rigidly secured within said barrel, said sinker housing being tubular with an enlarged hub portion at the rear end thereof and the forward annular portion of said hub arranged in contact with said interior abutment, said line sinker frictionally retained wholly within said line sinker housing, an intermediate solid, one piece movable plunger mounted within said frame structure connected to said power means, said releasable power means comprising a releasable compressible spring and trigger means, said plunger having a forward end portion and a rearward end portion with a grooved collar intermediate its ends and of a greater diameter than that of said end portions, said forward end portion of said plunger being larger in diameter than that of said rear end portion thereof, said collar arranged with its outer side in contact with said interior abutment, the inner side of said collar in engagement with the outer end of said spring, and the outer end of said forward end portion of said plunger adapted to strike the said line sinker whereby said line sinker is projected to carry the long line and also the short line with the bait-hook therewith for casting purposes.

2. A gun-type bait hook caster according to claim 1 wherein a tubular sleeve extension is snugly assembled upon the outer end portion of said barrel, said tubular sleeve having a bore forming a continuation of the bore of said sinker housing, thumb screw means for securing said tubular sleeve to said barrel, a pin type plunger projecting vertically and radially through the lower wall of said tubular sleeve and into the bore thereof, the inner end of said pin type plunger being rounded, said pin type plunger having an intermediate circular flange formed therewith, a bracket assembled adjacent and surrounding said pin type plunger and rigidly secured to the bottom side of said tubular sleeve, an adjustable thimble threaded into said bracket, a coil type compression spring sleeved about said pin type plunger and arranged between said thimble and said circular flange yieldably pressing said flange against said tubular sleeve, said flange limiting the extension of said pin type plunger within the bore of said tubular sleeve, the adjustment of said thimble in said bracket varying the compression force of said spring and determining the pressure of said pin type plunger against the tapered surface of said cone shaped portion of said sinker, whereby the inner end of said pin type plunger resiliently and temporarily retains said sinker in said housing prior to being projected and released therefrom.

References Cited in the file of this patent

UNITED STATES PATENTS

| | | |
|---|---|---|
| 959,889 | Searle | May 31, 1910 |
| 1,473,507 | Obermaier | Nov. 6, 1923 |
| 2,225,719 | Shotton | Dec. 24, 1940 |
| 2,873,547 | Coelho | Feb. 17, 1959 |
| 2,930,584 | Hansley et al. | Mar. 29, 1960 |

FOREIGN PATENTS

| | | |
|---|---|---|
| 659,718 | Great Britain | Oct. 24, 1951 |